D. W. SMITH.
WHEEL HUB AND BEARING SLEEVE.
APPLICATION FILED APR. 29, 1912.
1,118,691.
Patented Nov. 24, 1914.
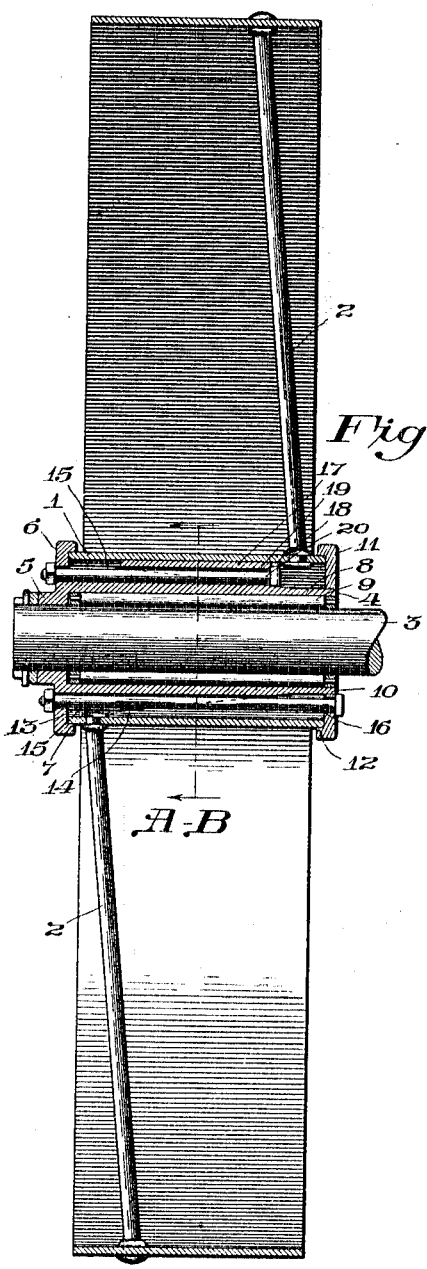
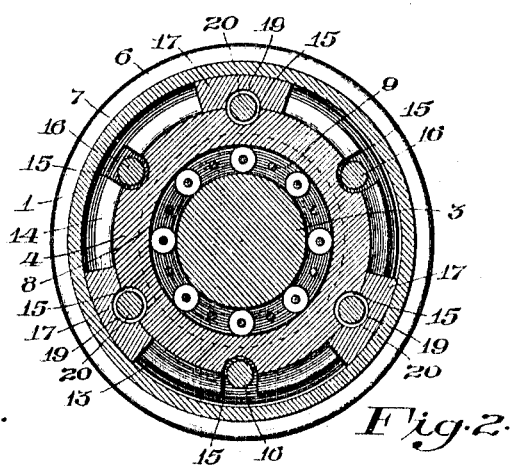
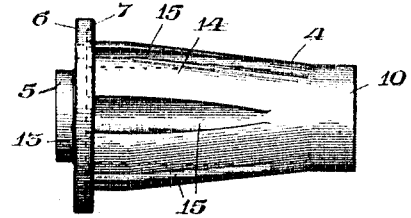
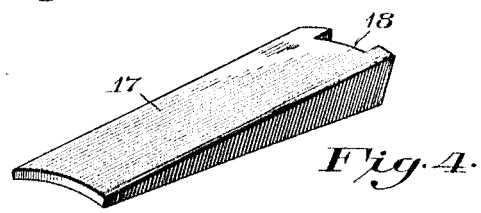
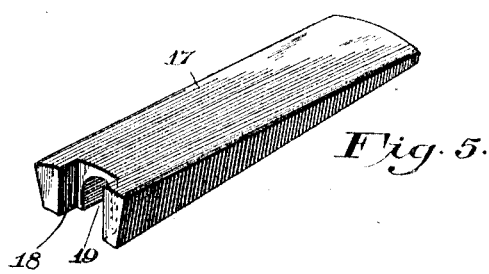
Witnesses:
F. W. Hoffmeister
C. C. Palmer
Inventor.
Daniel W. Smith
By D. W. Burgess
Attorney.

UNITED STATES PATENT OFFICE.

DANIEL W. SMITH, OF CHICAGO, ILLINOIS, ASSIGNOR TO INTERNATIONAL HARVESTER COMPANY OF NEW JERSEY, A CORPORATION OF NEW JERSEY.

WHEEL-HUB AND BEARING-SLEEVE.

1,118,691.      Specification of Letters Patent.     Patented Nov. 24, 1914.

Application filed April 29, 1912. Serial No. 694,002.

*To all whom it may concern:*

Be it known that I, DANIEL W. SMITH, a citizen of the United States, residing at Chicago, in the county of Cook and State of Illinois, have invented certain new and useful Improvements in Wheel-Hubs and Bearing-Sleeves, of which the following is a specification.

My invention relates to wheel hubs having a removable bearing sleeve forming a journal for the axle upon which the wheel is mounted, the object being to provide improved means whereby the sleeve may be securely held in proper relation with the cylindrical shell forming the wheel hub. This object is attained by means of mechanism, one embodiment of which is illustrated in the accompanying drawings, in which—

Figure 1 represents a vertical section of a wheel having my invention embodied in its construction; Fig. 2 is a cross section of Fig. 1 on an enlarged scale along line A—B; Fig. 3 is a detached detail designed to illustrate the form of the bearing sleeve; Fig. 4 is a view in perspective on an enlarged scale, of one of the binding wedges; and Fig. 5 is a view similar to Fig. 4 and representing the wedge in a reversed position.

The same reference characters designate like parts throughout the several views.

1 represents a cylindrical shell forming the hub of a wheel and to which the inner ends of spokes 2 are secured, 3 an axle, and 4 a sleeve having a boss portion 5 at one end thereof that receives the axle, and a flange portion 6 surrounding the boss and provided with an annular inwardly projecting rib portion 7 that receives the end of the shell 1. The sleeve is preferably provided with an internal chamber portion 8 that receives a roller bearing mechanism 9, and a cylindrical portion 10 that is received by an axial opening in a circular cap plate 11 provided with an annular rib portion 12 like rib 7 that receives the opposite end of the shell. The sleeve has an enlarged cylindrical portion 13 adjacent the flange 6, and then an inwardly tapering portion 14 that terminates in the cylindrical portion 10 and is provided with a series (preferably six in number) of axially alined channels 15, spaced apart and adapted to receive bolts 16 in each alternate channel, that pass through openings in the cap plate 11 and the flange 6 in a manner to secure the sleeve against endwise movement within the shell 1.

17 represents wedge members having the inner and outside surfaces thereof concentric with the axis of the sleeve, and the heads thereof with radially arranged slots 18 and longitudinally arranged channels 19, the wedges being adapted to slide upon the tapered portion of the sleeve and engage with the inner wall of the shell, and bolts 20 having heads received by the slots 18 and the body portions thereof by the channels 19 in the wedges and 15 in the surface of the sleeve, operate to draw the wedges longitudinally in a manner to center the sleeve within the shell and in an expanding manner press against the inner walls thereof.

While I have specifically disclosed one embodiment of my invention in this application, it is, of course, to be understood that the form shown is used for purposes of illustration and that the invention itself may be embodied in other forms without departing from its spirit.

What I claim as my invention, and desire to secure by Letters Patent, is:

1. A wheel hub and sleeve bearing having, in combination, a cylindrical shell to which may be secured the wheel spokes, a removable tapered sleeve adapted to be received by said shell, a series of longitudinally movable oppositely tapered wedges mounted upon said sleeve and engaging with the inner wall of said shell, and means operatively connected between said sleeve and said wedges for adjusting the latter longitudinally.

2. A wheel hub and sleeve bearing having, in combination, a cylindrical shell to which may be secured the wheel spokes, a removable sleeve adapted to be received by said shell having a tapering body portion, and a series of longitudinally movable oppositely tapered wedges mounted upon the tapering portion of said sleeve and engaging with the inner wall of said shell, and a plurality of bolts operatively connecting said sleeve and wedges for adjusting the latter longitudinally.

3. In a wheel hub and sleeve bearing, a wheel hub, an externally tapered longitudinally grooved sleeve receivable therein and having a flange thereon, a plurality of longitudinally grooved wedges oppositely tapered and disposed between the outer periphery of said sleeve and the inner periphery of said hub, and a plurality of adjustable locking members receivable in the grooves in said sleeve and wedges locking said wedges to said flange.

4. In a wheel hub and sleeve bearing, a wheel hub, a longitudinally grooved externally tapered sleeve receivable therein and having a flange thereon adapted to fit over one end thereof, an end cap inclosing the opposite end of said hub, a plurality of wedges oppositely tapered and disposed between the external surface of said sleeve and the internal surface of said hub, and a plurality of adjustable locking members extending through said grooves and locking said wedges to said flange.

5. In a wheel hub and sleeve bearing, a wheel hub, a sleeve extending therethrough having a flange thereon inclosing one end of said hub, an end cap inclosing the opposite end of said hub, means intermediate said hub and said sleeve for locking the parts against relative rotation, and means intermediate said flange and said end cap for clamping said parts together.

6. In a wheel hub and sleeve bearing, a wheel hub, a sleeve extending therethrough having a flange thereon inclosing one end of said hub, an end cap inclosing the opposite end of said hub, wedges intermediate said sleeve and said hub, means operatively connected to said flange for adjusting said wedges longitudinally, and means operatively connected between said flange and said cap for positioning the latter upon the hub.

7. In a wheel hub and sleeve bearing, a wheel hub, a sleeve extending therethrough having a flange thereon inclosing one end of said hub, an end cap inclosing the opposite end of the hub, a plurality of wedges interposed between said sleeve and hub, means operatively connected to said flange for adjusting said wedges longitudinally of said sleeve, and means operatively connected between said flange and end cap and extending longitudinally of said sleeve between certain of said wedges for clamping the parts together.

8. A wheel hub and sleeve bearing having, in combination, a cylindrical shell to which may be secured the wheel spokes, a removable sleeve having a flange at one end thereof adapted to engage with one end of said shell, a cap plate having an axial opening adapted to receive the opposite end of said sleeve, said plate engaging with the opposite end of said shell, a series of bolts passing through openings in said flange and plate and operative to secure the sleeve and shell together, and a series of wedges interposed between the inner wall of said shell and said sleeve, and means for moving said wedges in a direction to increase the pressure thereof against said shell and sleeve.

9. A wheel hub and sleeve bearing having, in combination, a cylindrical shell to which may be secured the spokes of a wheel, a removable sleeve having a flange at one end thereof adapted to engage with one end of said shell, the body portion of said sleeve having a tapering form toward the opposite end thereof that terminates in a short cylindrical portion, a cap plate having an axial opening adapted to receive said cylindrical portion, said plate engaging with the opposite end of said shell, a series of longitudinally arranged channels spaced apart upon the tapering portion of said sleeve and terminating in openings through said flange, a series of wedges provided with channels therein adapted to register with the channels upon said sleeve, bolts received by alternate channels in said sleeve and openings in said plate and flange in a manner to secure the shell and sleeve in operative relation, and other bolts received by the remaining channels in said sleeve and the channels in said wedge and coöperating with said flange in a manner whereby said wedges may be drawn in close engagement with the inner wall of said shell and the body of said sleeve.

DANIEL W. SMITH.

Witnesses:
   C. G. Grzegorzewsk,
   E. L. Bacon.